Sept. 2, 1969  T. G. ROBERTS ET AL  3,464,223

TRAP PUMP FOR VACUUM SYSTEM

Filed Dec. 28, 1967  2 Sheets-Sheet 1

Thomas G. Roberts
Thomas A. Barr, Jr.
INVENTORS.

BY Harry M. Saragnitz
Edward J. Kelly
Herbert Beil
Harold W. Hilton

Sept. 2, 1969  T. G. ROBERTS ET AL  3,464,223
TRAP PUMP FOR VACUUM SYSTEM
Filed Dec. 28, 1967  2 Sheets-Sheet 2

Thomas G. Roberts
Thomas A. Barr, Jr.
INVENTORS.

BY Harry M. Saragovitz
Edward J. Kelly
Herbert Berl
Harold W. Hilton

United States Patent Office 3,464,223
Patented Sept. 2, 1969

3,464,223
TRAP PUMP FOR VACUUM SYSTEM
Thomas G. Roberts and Thomas A. Barr, Jr., Huntsville, Ala., assignors to the United States of America as represented by the Secretary of the Army
Filed Dec. 28, 1967, Ser. No. 694,189
Int. Cl. B01d 5/00
U.S. Cl. 62—55.5                                    9 Claims

ABSTRACT OF THE DISCLOSURE

A trap pump for lowering the pressure of a vacuum system, utilizing porous metallic plates, of copper, silver, etc. to eliminate the creep and backstreaming of diffusion pump fluids and vapors and to furnish a good thermal conductor so that molecular sieves, when used in the system, may be uniformly cooled. The pump includes a coolant reservoir enclosed by a heating jacket. The porous plates are mounted in a chamber interiorly of the heating jacket. The trap is placed in the pumping line between the pumps, valves, other baffles and the space to be evacuated. Gases pumped through the trap, pass through the chamber and through the porous plates for evacuation of the space to be evacuated.

Dedicatory clause

The invention described herein may be manufactured, used, and licensed by or for the Government for governmental purposes without the payment to us of any royalty thereon.

Background of the invention

The function of a cold trap is to lower the ultimate pressure of a vacuum system by preventing the backstreaming of diffusion pump fluids and vapors. Without traps and baffles the creep and backstreaming of pump fluids in diffussion pumps causes their pressure limit to be about $10^{-7}$ mm. of Hg. At this pressure the conventional diffusion pump becomes a source of contamination for a clean vacuum system.

A copper-foil trap which prevents the backstreaming of oil vapor without seriously restricting the pumping speed of the system has been utilized in the past. The copper-foil trap was effective even at room temperature and has been effective for periods of several months. It has been shown that an oil diffusion pump with the copper-foil trap would evacuate a system to pressures below $10^{-10}$ mm. of Hg. It has also been shown that in a baked oil diffusion pump system with a water cooled baffle and a copper-foil trap the residual hydrocarbons constitute a partial pressure of less than $2\times10^{-11}$ mm. of Hg. Furthermore, it has been found that by using a nonrefrigerated molecular sieve trap it is possible to achieve, for reasonably long times, ultrahigh vacuum with oil pumps.

The gathering action of molecular sieves is also utilized in commercial forepumps and sorption pumps. These pumps are used whenever absolute cleanliness or vibration free operation is required. In this application liquid nitrogen must be used during the time the pumping action is required. The most popular molecular sieves today are zeolite, alumina, and Linde 13X molecular sieve (synthetic zeolite).

Most commercially available cold traps and baffles are designed to minimize the backstreaming and creep of pump fluids without seriously restricting the conductance of the system. Some are bakeable and some prevent boil-off of previously trapped gas molecules. But none utilize the selective adsorption properties of copper-foils. Also in sorption pumps the poor thermal conductivity of the molecular sieves causes design problems.

Summary of the invention

The invention herein described is an optically dense trap, baffle, and sorption pump which utilizes porous copper or silver plates to eliminate the creep and backstreaming of pump fluids and to furnish a good thermal conductor so that molecular sieves may be uniformally cooled. The unique feature of the pump-trap is the use of the porous plates which have even better sorption properties than copper foil.

It is therefore, an object of the present invention to provide a trap for vacuum systems in which the excellent sorption properties of porous plates are utilized to eliminate creep and backstreaming of pump fluids.

It is a further object of the present invention to provide a trap with such plates in which the excellent thermal conductivities of the plates are utilized to insure that molecular sieves and all cold surfaces are kept at a uniform temperature.

It is still another object of the present invention to provide a trap pump which may be used as a trap and baffle at room temperature or when cooled.

It is yet another object of the present invention to provide a trap pump which may be used as an absorption pump if desired.

Other features and objects of the present invention will become more readily apparent from the following description and drawings.

One method of preparation of the porous metal plates consists of etching the zinc out of an alloy which is made of the metal under investigation and zinc.

The copper plates are made by etching the zinc out of brass shim stock about $5/1000''$ thick. These brass plates approximately three and one-fourth inches by six inches are etched for about one hundred hours in a boiling solution (104.6° C.) of one part by volume of C.P. Reagent hydrochloric acid and three parts by volume of distilled water. Termination of the etching process is indicated by the cessation of hydrogen formation on the surfaces of the metal plates. These plates, which are now copper, are boiled in distilled water for approximately two hours, and then warm air dried at a temperature of 200° C. The silver plates are made from a specially prepared alloy of 60 percent silver and 40 percent zinc. The silver plates, approximately one and one-half inches by four inches, and $12/1000''$ and $23/1000''$, respectively, are prepared by the same method as the copper plates, but in the case of the silver plates the reaction takes place in about twelve hours.

Description of the preferred embodiment

Figure 1:
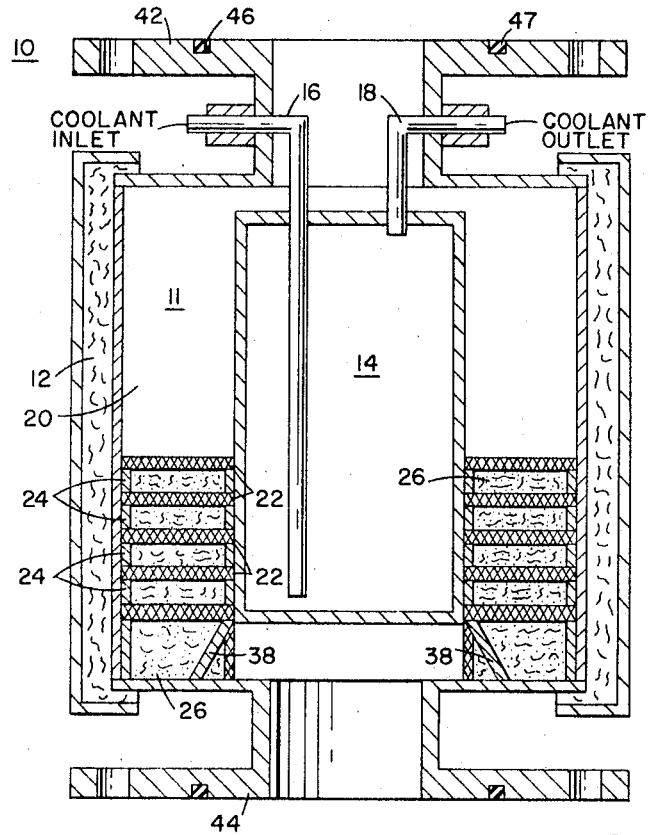
FIGURE 1 is an elevational sectional view of a trap pump utilizing the principles of our invention.

As shown in FIGURE 1, the trap pump 10 is shown to include a body 11 having an outer jacket 12, which may be a heating jacket similar to a Vacsorb bakeout unit, which is one type of commercially available absorption pumps. The jacket 12 serves as insulation when the heater is not used. A coolant reservoir 14 is mounted in the jacket and spaced therefrom. The reservoir is provided with inlet and outlet conduits 16 and 18.

An annular chamber 20 is formed between the reservoir and jacket. A plurality of porous plates 22 is mounted in the annular chamber in spaced relation and a plurality of annular support members 24 is mounted between the plates for support thereof and to maintain the spaced relation. Members 24 are preferably of copper or silver. A molecular sieve 26 may be mounted between the plates, if desired.

Molecular sieve 26 may be similar to Linde 13X mixed with small chips of porous copper, or the sieve may be of zeolite or alumina.

Figure 2:
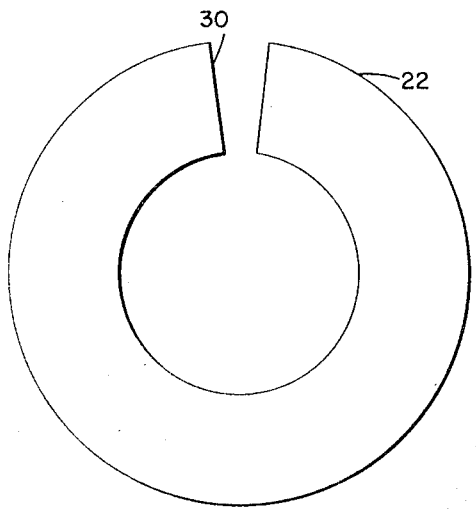
FIGURE 2 is a plan view of the porous plates used in the trap pump of FIGURE 1.
Figure 3:
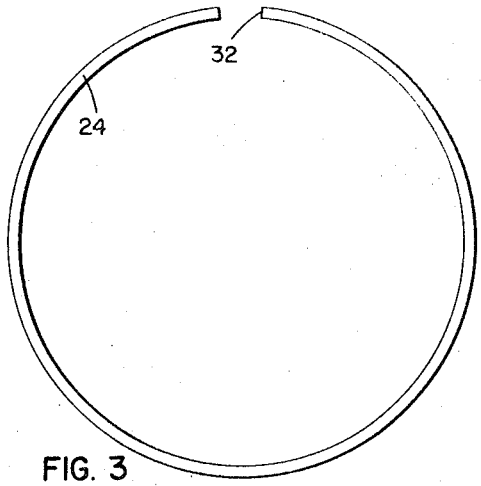
FIGURE 3 is a plan view of the supports for the porous plates.

Plates 22 and support members 24 may be provided with slots 30 and 32 respectively (FIGURES 2 and 3). The slots in porous plates 22 are disposed to allow for good conductance if the molecular sieve 26 is not used. The slots in support members 24 provide for expansion and contraction responsive to temperature variations.

The plates are preferably made of porous copper or silver. Copper and silver provide excellent sorption properties which eliminates creep and backstreaming of pump fluids. Copper and silver also provide excellent thermal conductivity which is utilized to insure that surfaces are kept at a uniform temperature. The porosity of the plates allows the gases in the system to be pumped through them, therefore, the plates can be used in almost any geometrical configuration in sorption pumps.

To support the reservoir in the trap pump, a plurality of legs 38 is mounted between the reservoir and a base portion 40 of trap 10 and carried around the legs is a copper or stainless steel screen.

To serve as a means to mount the trap in the vacuum system, the trap is provided with flanges 42 and 44. Flange 42 is disposed for connection to the volume being evacuated and may be provided with an annular groove 46 to receive an O ring 47 therein.

Figure 4:
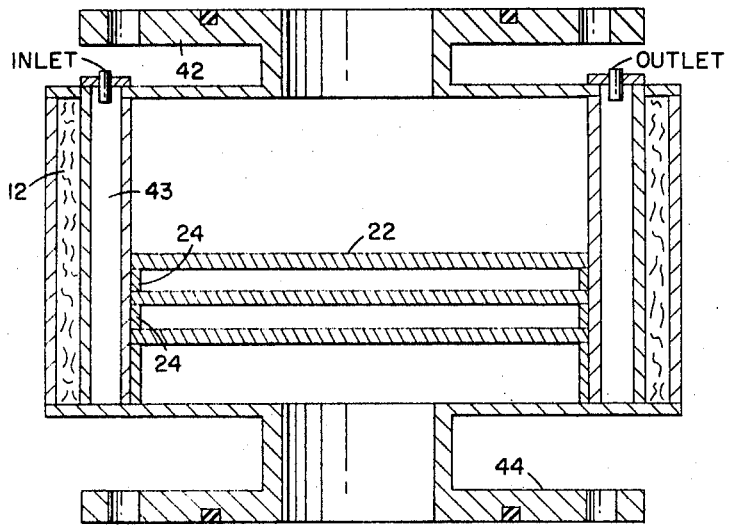
FIGURE 4 is an elevational sectional view of another embodiment of our invention.

Another embodiment of our invention is shown in FIGURE 4 wherein like reference numerals refer to like parts. This configuration shows the use of the porous plates in an optical dense baffle and cold trap. The trap includes flanges 42 and 44 for connecting the trap in the system. The reservoir in this embodiment is designated by the numeral 43 and is annular in configuration and disposed inwardly of and adjacent insulation jacket 12.

Porous plates 22 are mounted in spaced relation in the interior of the annular refrigeration reservoir 46 and is supported therein by support members 24. The porous plates of this embodiment are in the form of a disc and are also provided with slots 30 for reasons explained, supra. The slots are arranged in offset relation in the trap. That is, the slots are arranged in a spiral so that there is no line of sight through the trap. While no molecular sieve is illustrated in this embodiment it is to be understood that such sieve may be utilized, if desired.

There are no moving parts. The trap pump is simply placed in the pumping line between the pumps, valves and other baffles, and the volume to be evacuated. When a molecular sieve is not used, the apparatus works as a nonrefrigerated or refrigerated trap and optically dense baffle. When the molecular sieve is included, the apparatus may be used as a sorption pump. In this operation, as a sorption pump, the lower flange 44 would be sealed off with a metal plate. The porous plates and the molecular sieve would be activated by pumping while the heater is running, and then would be sealed off. A valve is placed between the trap pump and the volume to be evacuated. The valve would be opened and the refrigerant added to achieve the required vacuum. A demountable flange may be mounted just below flange 42 so that the molecular sieves may be periodically cleaned.

Figure 6:
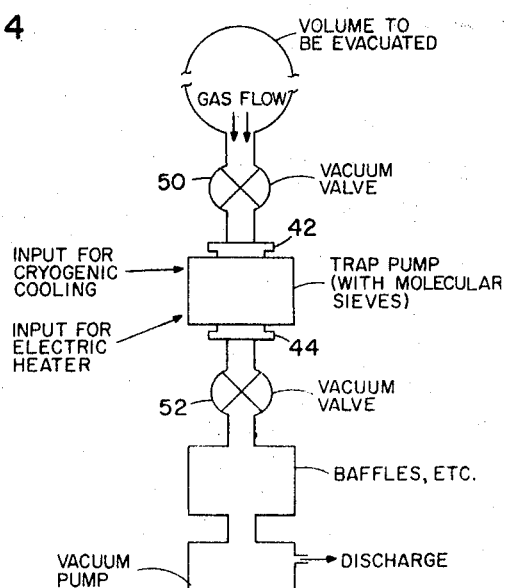
FIGURE 6 is a diagrammatic illustration of a typical system utilizing the trap pump of the present invention.
Figure 5:
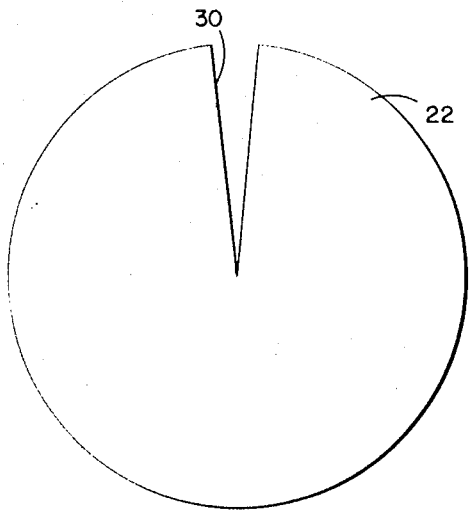
FIGURE 5 is a plan view of the porous plates used in the embodiment of FIGURE 4.

The trap pump may also be used in the following manner: The trap pump is to be installed in the vacuum line above the pumps, valves, and other baffles (FIGURE 6) but there is to be a high vacuum valve between the trap pump and the volume to be evacuated. The pump will be run to evacuate the volume to the lowest pressure possible. A high vacuum valve 50 above the trap pump will be closed and the heater turned on. After the molecular sieve and the porous plates have been outgased and with the high vacuum valve above the pumps closed, the heater is turned off. Now a valve 52 below the trap pump is closed, the valve above the trap pump is opened, and the refrigerant is added. This reduces the pressure to a still lower value.

While the foregoing has been a description of the preferred embodiments of my invention, it is to be understood that many modifications may be resorted to that is within the scope of the appended claims.

We claim:
1. A trap pump for ultra high vacuum systems comprising:
 (a) a body having an inlet and outlet and means for attachment of said inlet to a chamber to be evacuated and said outlet to pump means for effecting the evacuation of said chamber;
 (b) a coolant reservoir carried in said body and adapted for connection to a source of refrigerant;
 (c) heating and insulation means carried about said body;
 (d) a plurality of porous metallic plates carried in said body and disposed to permit evacuation of said chamber while preventing creep and backstreaming of pump fluids and vapors into said pump means.

2. Apparatus as in claim 1 wherein said porous metallic plates are copper.

3. Apparatus as in claim 1 wherein said porous metallic plates are silver.

4. Apparatus as in claim 1 wherein said plates are mounted in a chamber in said body in stacked, spaced relation, said chamber communicating with said inlet and outlet of said body.

5. Apparatus as in claim 4 including support means disposed for maintaining said plates in said spaced stacked relationship, said suport means being of substantially the same material as said plates.

6. Apparatus as in claim 5 including molecular sieve means mounted between said plates for absorbing said fluids and vapors of said system.

7. Apparatus as in claim 5 wherein said plates are annular in configuration and slotted to provide improved conductance.

8. Apparatus as in claim 5 wherein said plates are discoid and provided with a slot therein to provide improved conductance.

9. Apparatus as in claim 5 wherein said refrigerant is liquid nitrogen.

References Cited

UNITED STATES PATENTS

| 3,144,756 | 8/1964 | Arnold et al. | 62—268 |
| 3,296,810 | 1/1967 | Hablanian | 62—55.5 |
| 3,304,731 | 2/1967 | Bills et al. | 55—269 |
| 3,371,499 | 3/1968 | Hagenbach et al. | 62—55.5 |
| 3,391,546 | 7/1968 | Campbell | 62—48 |

LLOYD L. KING, Primary Examiner

U.S. Cl. X.R.

55—269